(12) United States Patent
Li et al.

(10) Patent No.: US 11,949,548 B2
(45) Date of Patent: Apr. 2, 2024

(54) METHOD FOR SERVICE STATUS ANALYSIS, SERVER, AND STORAGE MEDIUM

(71) Applicant: ZTE CORPORATION, Guangdong (CN)

(72) Inventors: Haibin Li, Guangdong (CN); Xinping Zhang, Guangdong (CN); Huifeng Guo, Guangdong (CN); Xin Peng, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/784,622

(22) PCT Filed: Nov. 20, 2020

(86) PCT No.: PCT/CN2020/130678
§ 371 (c)(1),
(2) Date: Jun. 10, 2022

(87) PCT Pub. No.: WO2021/120986
PCT Pub. Date: Jun. 24, 2021

(65) Prior Publication Data
US 2023/0010057 A1     Jan. 12, 2023

(30) Foreign Application Priority Data
Dec. 17, 2019    (CN) .......................... 201911301363.8

(51) Int. Cl.
*H04L 12/00*     (2006.01)
*G06F 16/901*     (2019.01)
(Continued)

(52) U.S. Cl.
CPC ........ *H04L 41/024* (2013.01); *G06F 16/9024* (2019.01); *H04L 41/14* (2013.01); *H04L 41/50* (2013.01)

(58) Field of Classification Search
CPC ....... H04L 41/024; H04L 41/14; H04L 41/50; H04L 41/052; H04L 41/5048;
(Continued)

(56) References Cited

U.S. PATENT DOCUMENTS 10,387,453 B1    8/2019   Norton et al.
10,673,645 B2 *   6/2020   Ansari .................... H04L 12/66
(Continued)

FOREIGN PATENT DOCUMENTS

CN     101957822 A     1/2011
CN     104572856 A     4/2015
(Continued)

OTHER PUBLICATIONS

Neelavathi et al., Service Selection Based on Status Identification SOA, Apr. 2011, 3rd International Conference on Electronics Computer Technology, pp. 113-116 (Year: 2011).*
(Continued)

*Primary Examiner* — Frantz Coby
(74) *Attorney, Agent, or Firm* — HAUPTMAN HAM, LLP

(57) ABSTRACT

Provided are a method for service status analysis, a server, and a storage medium. The method includes: for each vertex of multiple vertices in a graph database: reading out attribute data of the vertex, where the graph database is generated in advance according to a service description table, the vertex represents a service, and the attribute data of the vertex includes at least one service attribute of the service represented by the vertex; and according to the attribute data of the vertex and attribute data of each of multiple related vertices, determining a service status level of the service represented by the vertex, where each of the multiple related vertices has a propagation relationship with the vertex; and according to the service status level of each of the services
(Continued)

represented by the vertices, analyzing a service propagation network.

20 Claims, 9 Drawing Sheets

(51) Int. Cl.
  *H04L 41/02* (2022.01)
  *H04L 41/14* (2022.01)
  *H04L 41/50* (2022.01)
(58) Field of Classification Search
  CPC ............... H04L 41/5058; H04L 43/091; G06F 16/9024; G06F 11/36; G06F 16/90335
  USPC ......................................... 709/224–226, 229
  See application file for complete search history.

(56) References Cited

U.S. PATENT DOCUMENTS

| | | | | |
|---|---|---|---|---|
| 10,739,321 | B2* | 8/2020 | DeWitte | G01N 27/62 |
| 11,769,576 | B2* | 9/2023 | Moturu | G16H 40/20 |
| | | | | 705/2 |
| 2005/0246187 | A1* | 11/2005 | Maltzman | G06Q 30/016 |
| | | | | 705/7.41 |
| 2007/0226325 | A1* | 9/2007 | Bawa | H04L 12/4641 |
| | | | | 709/223 |
| 2008/0049031 | A1 | 2/2008 | Liao et al. | |
| 2008/0247320 | A1* | 10/2008 | Grah | H04L 41/5012 |
| | | | | 370/241 |
| 2009/0248803 | A1* | 10/2009 | Akaboshi | G06Q 10/06 |
| | | | | 709/224 |
| 2011/0316856 | A1* | 12/2011 | Poston | G06T 11/20 |
| | | | | 345/440 |
| 2019/0155795 | A1* | 5/2019 | Xiao | G06F 9/526 |
| 2021/0227069 | A1* | 7/2021 | Zhu | H04M 1/725 |

FOREIGN PATENT DOCUMENTS

| | | | | |
|---|---|---|---|---|
| CN | 105096297 | A | 11/2015 | |
| CN | 108334572 | A | 7/2018 | |
| CN | 107368605 | B | 12/2018 | |
| CN | 109033234 | A | 12/2018 | |
| CN | 109344269 | A | 2/2019 | |
| CN | 110516915 | A | 11/2019 | |
| EP | 3041254 | A1 * | 7/2016 | H04L 12/24 |

OTHER PUBLICATIONS

Stamou et al., Checkpoints for Service Level Operations, 2014 IEEE International Conference on services Computing, pp. 323-330. (Year: 2014).*

Bingming Huang et al., Research on the Application of Artificial Intelligence in Roots-tracing of Network Alarm, Designing Techniques of Posts and Telecommunications, Dec. 31, 2018, 6pgs.

Hanying Xi, Application of graph databases in network optimization systems, Telecommunications Technology, Sep. 2014, 4pgs.

ZTE Corporation, International Search Report with English translation, PCT/CN2020/130678, dated Jan. 27, 2021, 5pgs.

First Office Action issued in Chinese Application No. 201911301363.8; dated Apr. 25, 2023; 16 pgs.

* cited by examiner

METHOD FOR SERVICE STATUS ANALYSIS, SERVER, AND STORAGE MEDIUM

CROSS REFERENCE TO RELATED APPLICATIONS

This application is a United States National Stage Application filed under 35 U.S.C. § 371 of PCT Patent Application Serial No. PCT/CN2020/130678, filed Nov. 20, 2020, which claims priority to Chinese Patent Application No. 201911301363.8 filed on Dec. 17, 2019, each of which is incorporated herein by reference in its entirety.

TECHNICAL FIELD

Embodiments of the present disclosure relate to the field of communication technologies, and in particular to a method for service status analysis, a server, and a storage medium.

BACKGROUND

With constantly enlargement of telecommunication network, a structure of the network is increasingly complex. To satisfy the requirements of service status perception, there is a need to establish a complete, comprehensive, clear, and high-efficiency network/service relevance knowledge library to manage a huge service cluster of the telecommunication network. The knowledge library includes network fault alarm of a control plane and service performance of a forwarding plane. An existing network management system generally uses relational databases to store service-related information data, and various network structures and a relationship between services are represented and managed by attributes and foreign keys.

The inventor found that, in some circumstances in the field, using the relational database to manage the service data of the telecommunication network may result in scattered data storage, repeatedly storing of or missing some data storage, or a relatively low query efficiency. Therefore, it is difficulty to quickly perceive and analyze service status in real time, such that actual requirements of engineering operation and maintenance are hard to meet.

SUMMARY

The embodiments of the present disclosure aim to provide a method for service status analysis, a server, and a storage medium.

To solve the above technical problems at least to some degree, embodiments of the present disclosure provide a method for service status analysis. The method includes: for each respective vertex of multiple vertices in a graph database, reading out attribute data of the respective vertex, where the graph database is generated in advance according to a service description table, the respective vertex represents a respective service, and the attribute data of the respective vertex includes at least one service attribute of the respective service represented by the respective vertex; and according to the attribute data of the respective vertex and attribute data of each of multiple related vertices, determining a service status level of the respective service represented by the respective vertex, where each of the multiple related vertices has a propagation relationship with the respective vertex; and according to a service status level of each of multiple services represented by the multiple vertices, performing analysis on a service propagation network.

Embodiments of the present disclosure further provide a server, including at least one processor; and a memory in communication with the at least one processor. The memory stores instructions executable by the at least one processor, and the instructions, when executed by the at least one processor, cause the at least one processor to implement the method as described above.

Embodiment of the present disclosure further provide a computer-readable storage medium, storing computer programs. The computer programs, when executed by a processor, cause the processor to implement the above method.

In addition, the service status level of the vertex is determined according to the attribute data of the vertex and the attribute data of each of the multiple related vertices of the vertex as follows. An initial service status level of the vertex is calculated according to the attribute data of the vertex. At least one lower-level vertex of the vertex is determined according to the propagation relationship. According to the initial service status level of the vertex and a service status level of each of the at least one lower-level vertex, the service status level of the vertex is determined. By the above technical approach, service status of all current services can be analyzed quickly to obtain the service status level of each vertex, such that perception data of the initial service status of the entire telecommunication network can be obtained in real time.

In addition, after determining the service status level of the vertex according to the service attribute data of the vertex and the inter-vertex hierarchical relationship, the method further includes: in response to reception of a service attribute change message, determining a target vertex according to the service attribute change message, where a service represented by the target vertex is a service having a changed service attribute as indicated by the service attribute change message; adjusting attribute data of the target vertex according to the service attribute change message; and according to the adjusted attribute data, updating a service status level of the target vertex. By using the above technical approach, when a service in a network generates an alarm or changes in attribute, attribute data of vertices or edges in the graph database may be modified quickly and the service status level of the service represented by each vertex is re-analyzed, so as to obtain perception data of the service status of the entire network in real time.

In addition, the service attribute includes alarm data and performance data. The alarm data includes identifier information of alarm information in an alarm database. The alarm information is stored through an alarm identifier, such that detailed alarm information is queried for through the alarm identifier when it is necessary to analyze the alarm information. In this way, a storage space occupied by the graph database can be reduced and data reading efficiency can be improved.

Furthermore, the graph database is generated in advance according to the service description table as follows. The service description table is obtained. Where attribute data of each of several vertices and attribute data of each of edges connecting the several vertices are recorded in the service description table. A configuration file is generated according to the service description table, and information of at least one data source and at least one enumeration mapping relationship corresponding to each of values of the attribute data of each of the several vertices and the attribute data of each of the edges connecting the several vertices are added to the configuration file. The attribute data of each of the several vertices and the attribute data of each of the edges connecting the several vertices in the configuration file are imported in parallel to generate the graph database. By using the above approach, the construction of the service graph database can be sped up greatly.

BRIEF DESCRIPTION OF THE DRAWINGS

One or more embodiments of the present disclosure are illustrated in combination with corresponding accompanying drawings and the illustrative descriptions will not constitute limitation to the embodiments of the present disclosure.

DETAILED DESCRIPTION OF THE EMBODIMENTS

In order to make objects, technical solutions, and advantages of embodiments of the present disclosure clearer, the embodiments of the present disclosure may be described in detail in combination with accompanying drawings. However, those of ordinary skill in the art may understand that many technical details are provided in the embodiments of the present disclosure to help readers to understand the present disclosure better. The technical solutions claimed by the present disclosure can still be achieved based on various changes and modifications of the following embodiments without these technical details. The division of the following embodiments is made for convenience of illustration and shall not constitute any limitation to specific embodiments of the present disclosure. Various embodiments may be combined or referred to each other in case of no contradiction.

A first embodiment of the present disclosure relates to a method for service status analysis. In embodiments, for each vertex of multiple vertices in a graph database, reading out attribute data of the vertex in a graph database, where graph database is generated in advance according to a service description table, the vertex represents a service, and the attribute data of the vertex includes at least one service attribute of the service represented by the vertex; and according to the attribute data of the vertex and attribute data of each of multiple related vertices, determining a service status level of the service represented by the vertex, where each of the multiple related vertices has a propagation relationship with the vertex; and according to the service status level of each of the services represented by the multiple vertices, analyzing a service propagation network.

The method for service status analysis in embodiments may be described in detail below by taking constructing of a graph database of a carrier network as an example. The following contents are implementation details provided for convenience of understanding only, and are not necessary for implementation of the solution.

Figure 1:
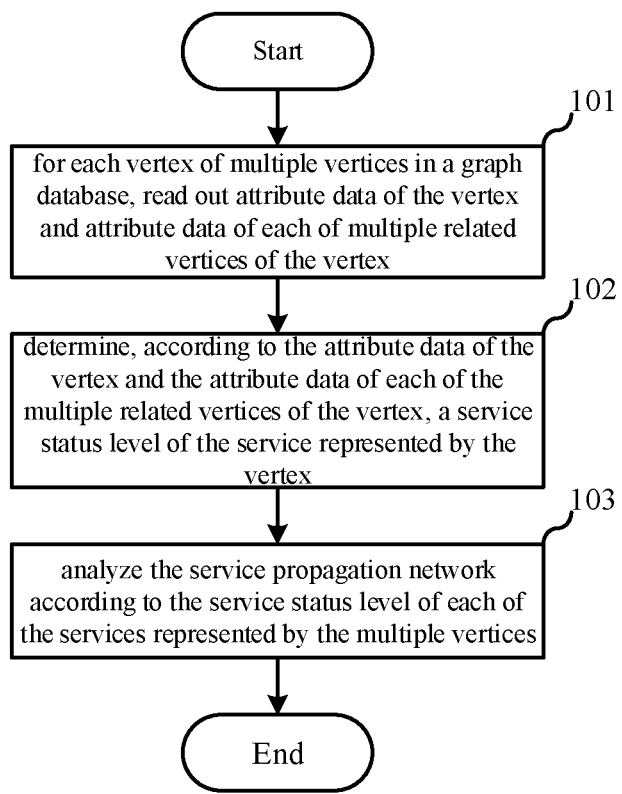
FIG. 1 is a flow chart illustrating a method for service status analysis according to a first embodiment of the present disclosure.

The method for service status analysis in embodiments is illustrated in FIG. 1 and begins at 101.

At 101, for each vertex of multiple vertices in a graph database, attribute data of the vertex and attribute data of each of multiple related vertices of the vertex are read out.

In embodiments, service status and a service propagation network are analyzed based on the graph database. Main elements of the graph database include: vertices and edges, where the vertex represents a service and the edge represents a relationship between services. The service represented by the vertex includes: a resource object, a single-point service instance, a peer-to-peer object, an operation administration and maintenance (OAM) object, a protocol instance, and a protection relationship, and other categories. Each category includes several specific types. For example, the resource object includes a network element, a single board, a port, and the like. The single-point service instance includes a section node (TmsNode) and the like. The peer-to-peer object includes a topological link (TL), a T-multi-protocol label switching section (T-MPLS Section, TMS), and the like. The protection relationship includes pseudo-wire group (PWGroup), and the like. A relationship between services that is represented by the edge includes: multiplex, including, belonging, topology, holds, relying, or the like. For example, the network element "holds" the single board, and the port "belongs" to the topological link. A primary key value attribute object identifier (oid) of a string type is defined for each of all vertices, i.e., a name of each vertex is defined.

In some examples, the vertex and the edge each may store corresponding attribute data. For example, in the vertex, data related to one or more service attributes of the service represented by the vertex is stored, and in the edge, a propagation relationship between services, which is determined based on a service propagation rule. The multiple related vertices of the vertex are determined according to the vertex and edges connecting the vertex. The service propagation rule refers to a traffic forwarding rule on a forwarding plane. A hierarchical relationship is determined according to a processing order of traffics by each service. At least one data source of the vertex or the edge includes: a relational database and a local comma-separated values (CSV) file. By using data from either of the two data sources, vertices and edges of the graph database can be constructed. Further, when attribute data of a vertex can be obtained from multiple data sources, several different instances of the vertex can be created based on the multiple data sources.

Figure 2:
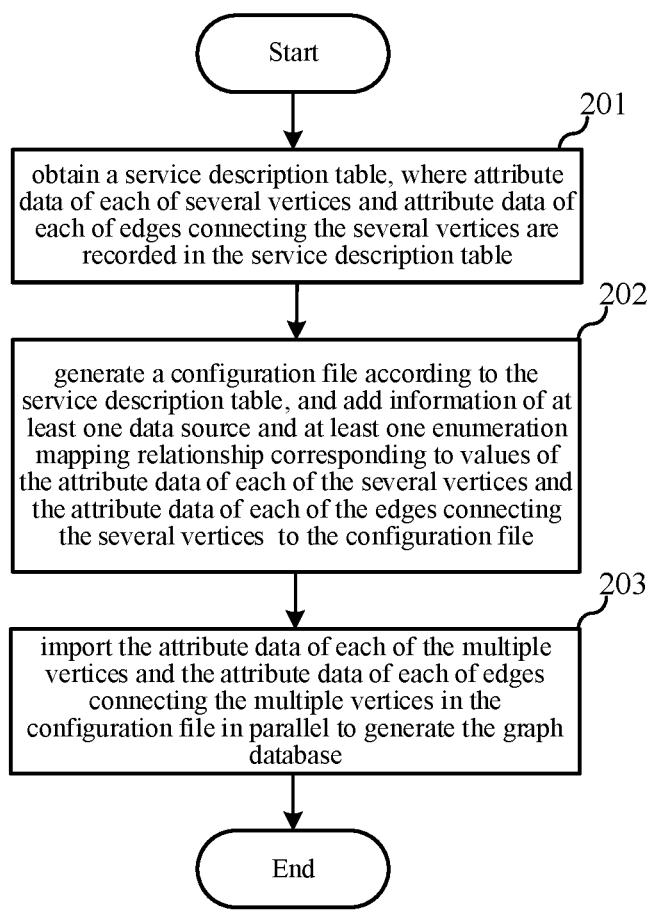
FIG. 2 is a flow chart illustrating a method for generating a graph database according to a first embodiment of the present disclosure.

As illustrated in FIG. 2, the graph database may be generated as follows.

At 201, the service description table is obtained, where attribute data of each of several vertices and attribute data of each of edges connecting the several vertices are recorded in the service description table.

Specifically, the service description table includes attribute data related to vertices and edges and information of data sources which are required for constructing the graph database. The service description table may be an Excel spreadsheet file. The spreadsheet file is generated by performing arrangement on data of the vertices and edges based on a current data source by operations. The data source may be a single data source or complex data source. The complex data source represents that the data are from different relational databases or local CSV files, or from different fields of a same relational database or local CSV file.

At 202, a configuration file is generated according to the service description table, and information of at least one data source and at least one enumeration mapping relationship corresponding to values of the attribute data of each of the several vertices and the attribute data of each of the edges connecting the several vertices are added to the configuration file.

After the service description table is read out, the spreadsheet file is converted into the configuration file, where the configuration file may be in a format of yaml or json. In this case, a value (attribute value) of each of at least one attribute of each of the vertices and the edges in the configuration file is an initial value. In order to reduce a storage space required for constructing the graph database and improve data reading efficiency of the graph database, an enumeration mapping may be configured for attribute values of the vertices and the edges to establish a mapping relationship between a range of a value of one attribute (attribute value range) and a fixed value, so as to enable all attribute value ranges to be mapped to a limited number of fixed values. By taking an attribute array [NA, Master, Slave] as an example, an element at each position is converted into a corresponding value, for example, an array [0, 1, 2] may be obtained after converting. The two arrays form an array mapping pair. For example, an initial value of Master is converted into 1. Further, there may be several different mapping relationships, and thus after the enumeration mapping, several array mapping pairs may be formed. Since different mapping relationships may be used for mapping of attribute values, different array mapping pairs may be obtained. The above array [NA, Master, Slave] is taken as an example for further illustration. For example, when the enumeration mapping is carried out by using a first mapping relationship, a mapping array [0, 1, 2] is obtained. When the enumeration mapping is carried out by using a second mapping relationship, a mapping array [1, 3, 4] is obtained.

In addition, adding the information of the at least one data source includes adding a drive name, an uniform resource locator (url), and an username/password, and so on. For example, the data source is a local file, e.g., a csv file, and the local file can be directly read based on a csv read drive or the csv file is first imported into a relational database before further processing is performed.

In some examples, information of the attribute data of the vertices and the edges in the configuration file may be added as follows. If multiple attributes of a vertex are obtained from a same data source, a name/type of each of the attributes, the data source of each of the attributes, a query statement, a name of the data source, and a name of an enumeration mapping. If multiple attributes of a vertex are obtained from different data sources, the above information also needs to be added, such that attribute values of the vertex are formed by data from different data sources. Specifically, for an attribute value obtained by combining several values, a splicing function needs to be provided. The splicing function is defined by a user, an input parameter of the function is field information obtained from different data sources, and an output of the function is an attribute value obtained through logical analysis. The primary key values of two vertices are obtained. Simple edges may be obtained directly through statement query, and Complex edges may be obtained by performing analysis based on the self-defined function after statement query. Furthermore, some edges have attribute values, where a manner in which the attribute values of the edges are obtained is similar to that in which the attribute values of the vertices are obtained.

At 203, the attribute data of each of the multiple vertices and the attribute data of each of edges connecting the multiple vertices in the configuration file are imported in parallel to generate the graph database.

To improve data import efficiency of the graph database and speed up construction of the graph database, the data may be imported in parallel. For example, a single-process multi-thread manner may be adopted, such that concurrent management may be performed through a thread pool. For another example, tasks imported in parallel are processed in a multi-process manner. The specific implementation process is described below.

1) Schema of the graph database is created, and an importing module determines names, attributes, and types of vertices and edges of the graph database by performing analysis on the configuration file.

2) Vertices of the graph database are created, and the importing module obtains information of the vertices from the at least one data source based on the configuration file to import information of the vertices into the database smoothly (i.e., the vertices may be created). In addition, due to independence of each vertex, no access conflict may occur, such that vertices can be created concurrently, thereby improving efficiency.

3) Edges of the graph database are created, and the importing module reads out data from a database and creates instances. If edges of different types correspond to different vertices, the edges of different types can be imported into the graph database concurrently; otherwise, the edges of different types may be written into the graph database sequentially. For example, an edge connecting vertex (network element) A and vertex (single board) B is x1 (indicating a holds relationship between the two vertices), an edge connecting vertex (port) C and vertex (VC12) D is also x1 (indicating a holds relationship between the two vertices), and an edge connecting vertex (port) C and vertex (optical flexible point (FP)) E is x2 (indicating a multiplex relationship between the two vertices). When both edge x1 and edge x2 correspond to vertex C, edge x1 and edge x2 may be created in sequence. Otherwise, edge x1 and edge x2 may be created concurrently, e.g., edge x1 between vertex A and vertex B and edge x2 between vertex C and vertex E can be created concurrently.

Furthermore, to speed up construction of the database, a solid state drive may be used as a storage device of a server for constructing the graph database.

Figure 3:
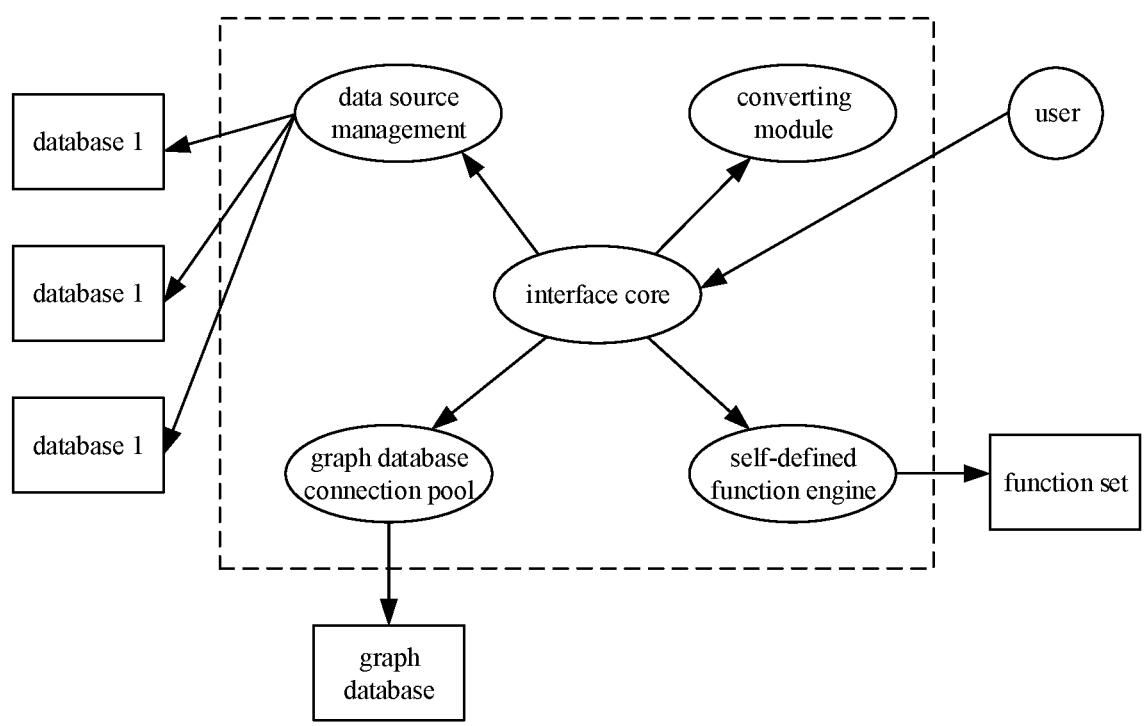
FIG. 3 is a structural schematic diagram illustrating a graph-database creating module according to a first embodiment of the present disclosure.

In some implementations, the graph database is constructed by adopting a module structure illustrated in FIG. 3. An interface core (ImportCore) manages multiple data sources (Data1, Date2, Date3) through a data source managing module, reads the spreadsheet file (Table) and the configuration file (Config) written by operations, and triggers to import data from the data source, e.g., the relational database or local CSV file, into the graph database in response to reception of an instruction for constructing the graph database from the operations. The ImportCore is communicated with the graph database (GDB) through a graph database connection pool, and performs enumeration mapping on the attribute data in the configuration file by using a user-defined function used in the Config through a self-defined function engine. The Table (description table) includes information of the vertices and information of the at least one data source of the graph database. The Config is a configuration file in a format which is easily readable by human or program, e.g., in a format of json or yaml. A Table-to-Config converting module is configured to convert the spreadsheet file into the configuration file.

At 102, according to the attribute data of the vertex and the attribute data of each of the multiple related vertices of the vertex, a service status level of the service represented by the vertex is determined.

Specifically, after the graph database is constructed and an instruction indicative of completion of construction of the graph database is obtained, the service status level of each vertex can be calculated and the service status level is initialized. The service status level is indicative of operation status of a current service. For example, a lower service status level indicates that operation status of the service is better, and a higher service status level indicates that the operation status of the service is worse. The highest service status level means the service cannot be operated. Since various services are interrelated, when one service cannot be operated normally, operation status of other services may be affected. Therefore, after the service status level of the service represented by the vertex is calculated based on the attribute data of the vertex, an influence of adjacent services on the service status level based on a propagation relationship between services is determined. That is, an actual service status level of a service represented by a vertex is determined according to the attribute data of the vertex and the attribute data of each of multiple related vertices of the vertex.

In an example, the attribute data of the vertex mainly includes alarm data and performance data. The data are obtained from the data source and imported. The data is filtered during importing, such that only data that affects the service status level may be retained and the retained data may be respectively stored at different positions in the attribute based on an influence level of each data on the service. For example, the alarm data is stored in a failure alarm list and a deterioration alarm list respectively. To facilitate calculation of the service status level and save the storage space, values of the retained data are generally set to integers. In some implementations, the service status level may be set based on actual requirements and experiences. For example, the service status level may include four types: failure, deterioration, degradation, and normal. The failure, deterioration, degradation, and normal may be respectively expressed as 3, 2, 1, and 0 in the form of integral values.

At 103, the service propagation network is analyzed according to the service status level of each of the services represented by the multiple vertices.

Specifically, after the service status level of each service in the service propagation network is determined, it means that a current network management system can fully perceive current operation status of the services in the service propagation network, such that a peer-to-peer service status level can be quickly calculated and present.

It is to be noted that the above examples in implementations are provided only for convenience of understanding and do not constitute any limitation to the technical solutions of the present disclosure.

Compared with an existing method for service status analysis, in embodiments, centralized storage of service data is achieved by means of the graph database generated in advance according to the service data. The service is represented by the vertex and a relationship between services is represented by the edge. Thereafter, initialization calculation of the service status level of the service may be carried out according to the attribute data of the vertex and each of the multiple related vertices of the vertex. Each related vertex is determined according to an edge between vertices. In this way, initial service operation status perception data can be obtained quickly, and the service propagation network is analyzed according to the service operation status, thereby satisfying the requirements of intelligent operation maintenance.

Figure 4:
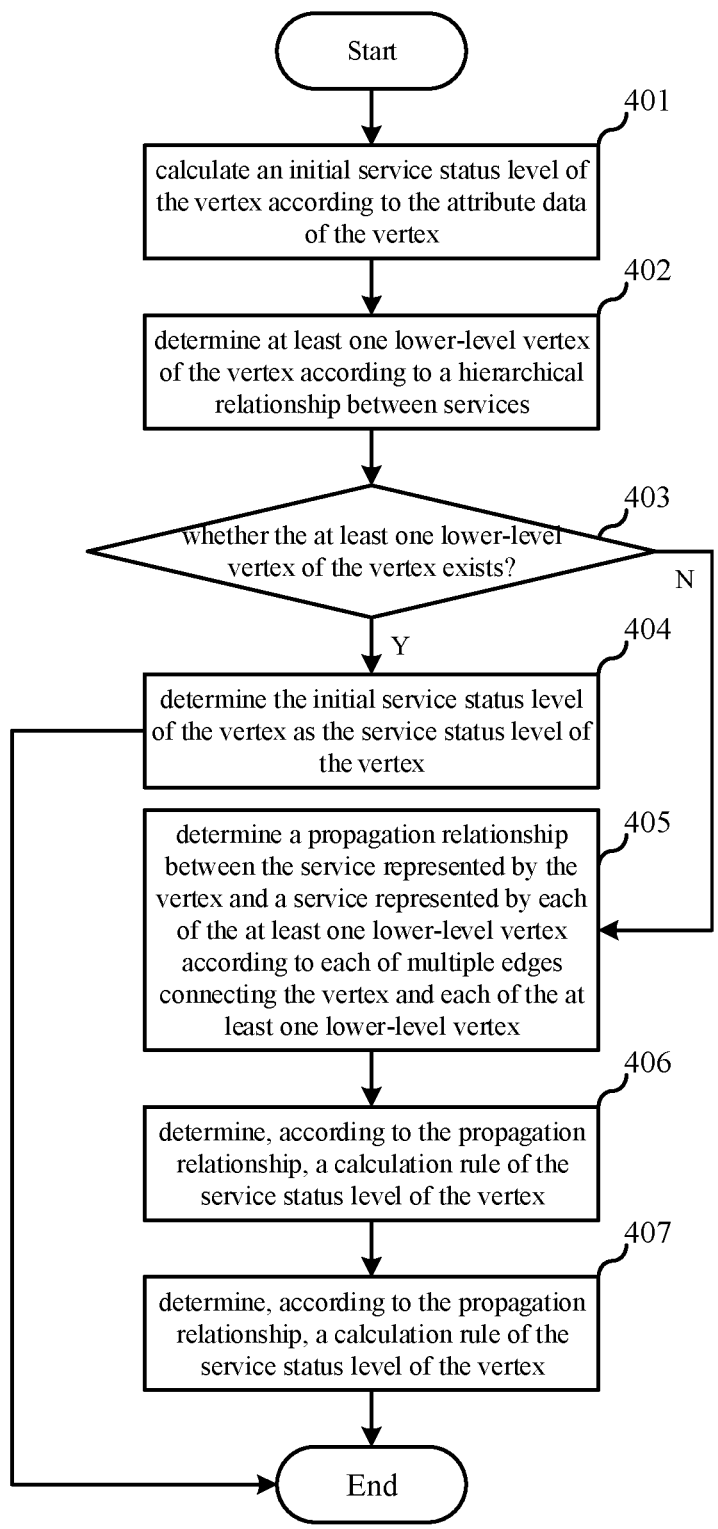
FIG. 4 is a flow chart illustrating a method for determining a service status level according to a second embodiment of the present disclosure.

A second embodiment of the present disclosure specifically describes how to determine the service status level of the service represented by the vertex according to the attribute data of the vertex and the attribute data of each of multiple related vertices of the vertex. As illustrated in FIG. 4, following operations may be conducted.

At 401, an initial service status level of the vertex is calculated according to the attribute data of the vertex.

Specifically, after the graph database is constructed, attribute data related to each of the vertices representing services is read out from the graph database, and then initialization is performed on the service status level of each of all the vertices. First, for each of all the vertices, the initial service status level of the vertex is calculated according to the attribute data stored in the vertex, where the attribute data includes alarm/performance data, and different calculation rules may be applied to attribute data of vertices of different types. In embodiments, the service status level may include four types: failure, deterioration, degradation, and normal. The service status levels may be stored in relevant failure/deterioration lists in the form of digits. For example, failure, deterioration, degradation, and normal may be respectively expressed as 3, 2, 1, and 0.

At 402, at least one lower-level vertex of the vertex is determined according to a hierarchical relationship (propagation relationship) between services.

Specifically, the hierarchical relationship between the services is stored in the attribute data of the edges and the relationship between the vertex and the lower-level vertex of the vertex is stored in the attribute data of the edge connecting the two vertices (i.e., the vertex and the lower-level vertex). The hierarchical relationship is stored in the attribute data of the edge in the form of direction attribute, which indicates a direction from the lower-level vertex to the upper-level vertex. According to the preset service propagation rule, the traffic propagates in a direction from the lower-level vertex to the upper-level vertex. Therefore, the operation status of the lower-level service may affect the operation status of the upper-level service, that is, the service status level of the lower-level vertex may affect the service status level of the upper-level vertex. Thus, before a service status level of a vertex is calculated, it is necessary to determine one or more lower-level vertices corresponding to the vertex. One vertex may correspond to a single lower-level vertex or to multiple lower-level vertices. When one vertex corresponds to multiple lower-level vertices, the service status level of each of the multiple lower-level vertices may affect the service status level of the vertex.

At 403, whether the at least one lower-level vertex of the vertex exists is determined. If there is no lower-level vertex of the vertex, proceed to operations at 404; if the at least one lower-level vertex of the vertex exists, proceed to operations at 407.

At 404, the initial service status level of the vertex is determined as the service status level of the vertex.

Specifically, for a vertex located at a penultimate layer or higher layer, each vertex may have one or more lower-level vertices. Therefore, the service status level of the vertex is determined according to both the initial service status level of the vertex and the service status level of each of the one or more lower-level vertices of the vertex.

For a vertex at a lowest layer, the vertex does not have a lower-level vertex. When it is determined that a vertex does not have a lower-level vertex, it indicates that the vertex is a lowest-level vertex (i.e., located at the lowest layer). Therefore, the initial service status level of the vertex is directly determined as the service status level of the vertex, to continue to be propagated to the upper-level vertex and reported outward.

At 405, a propagation relationship (service relationship) between the service represented by the vertex and a service represented by each of the at least one lower-level vertex is determined according to each of multiple edges connecting the vertex and each of the at least one lower-level vertex.

At 406, according to the propagation relationship, a calculation rule of the service status level of the vertex is determined.

At 407, according to the calculation rule, the service status level of the vertex is calculated.

Specifically, for the vertex located at the penultimate layer or higher layer, since one vertex may have multiple lower-level vertices, it is necessary to calculate the service status level of a current vertex according to a service status level of each of the multiple lower-level vertices of the current vertex. Different relationships between the vertex and the lower-level vertex may correspond to different calculation rules.

In some examples, if the service represented by the current vertex is a port and the service represented by the lower-level vertex is a single board, the service relationship between the port and the single board is a direct transmission single board, and thus a service status level of the direct transmission single board is determined as a service status level of the port.

In other examples, if the current vertex represents a tunnel service, the at least one lower-level service corresponding to the tunnel service includes: a label distribution protocol (LDP), an open shortest path first (OSPF) protocol or an intermediate system to intermediate system (ISIS) protocol, and master and slave label switching path (LSP). If the service represented by the lower-level vertex corresponding to the current vertex is master and slave LSP, a service status level of the tunnel service (tunnel service status level) may correspond to multiple calculation rules, which are illustrated in following tables. Combination of service status levels of master and slave LSP Tunnel service status level
Failure+Failure Failure
Failure+Normal Degradation
Deterioration (no failure alarm)+NormalDeterioration
Deterioration (with failure alarm)+Normal Normal
Failure+Deterioration Degradation+Deterioration
Normal+Normal Normal After the service status level of the tunnel service is obtained, determine whether the initial service status level of the vertex and the calculated service status level of the tunnel service are consistent. When the initial service status level of the vertex is consistent with the service status level of the tunnel service, the initial service status level of the vertex is determined as the service status level of the vertex. When the initial service status level of the vertex is not consistent with the service status level of the tunnel service, a higher service status level between the initial service status level of the vertex and the service status level of the tunnel service is determined as the service status level of the vertex.

In implementations, the above operations at 401 to 407 are repeatedly performed on each vertex of each layer until the service status level of each of all vertices are calculated, so as to complete initialization of the service status levels of all vertices in the entire network.

Figure 5:
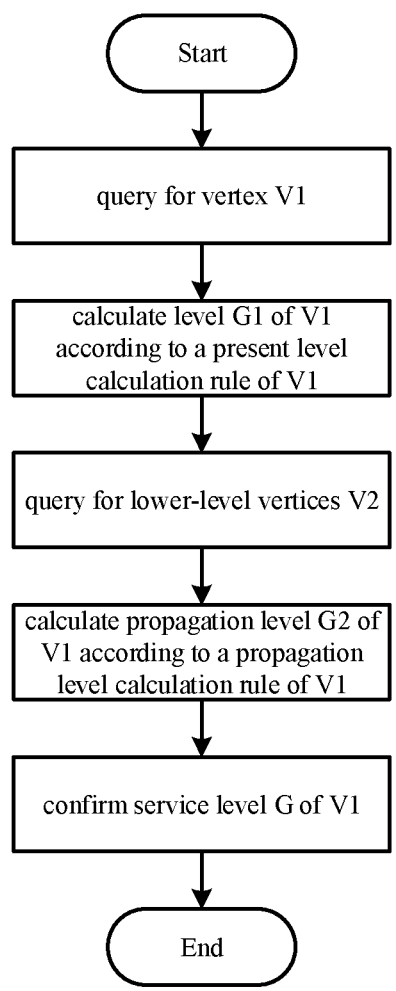
FIG. 5 is a flow chart illustrating a method for initializing a service status level according to a second embodiment of the present disclosure.

In implementations, specific details of the initialization of the service status level described in operations at 402 to 407 are illustrated in FIG. 5.

First, all vertices are queried for based on an identifier ID of vertex V1 and then stored in a list, and for each vertex in the list, calculation is conducted. In order to ensure calculation efficiency, according to a layer of each of the vertices in the list, the calculation may be concurrently carried out by adopting a multi-thread manner.

According to alarm/performance data stored in attribute data of vertex V1, in combination with a corresponding calculation rule, initial service status level G1 of vertex V1 is calculated.

Thereafter, all lower-level vertices V2 of vertex V1 and a service status level of each of vertices V2 are queried for. According to the service status level of each of vertices V2 and a service status level calculation rule stored in attribute data of each of edges, service status level G2 of vertex V1 is calculated.

Finally, G1 and G2 are compared, and then a larger value between G1 and G2 is determined as service status level G of the current vertex.

It is to be noted that the initialization of the service status level mentioned herein has no confliction on modification of the attribute of the vertex and can be concurrently processed by adopting the multi-thread manner, which greatly improves efficiency of the initialization of the service status level.

It is to be noted that the above examples in implementations are provided only for easy understanding and do not constitute any limitation to the technical solutions of the present disclosure.

The division of the steps of the above method is used only for clear description and the steps can be combined into one step or some steps can be divided into several steps in implementations, which shall fall within the scope of protection of the present disclosure as long as they include a same logical relationship. Adding of unnecessary modifications or introducing of unnecessary design in an algorithm or flow shall fall within the scope of protection of the present disclosure as long as the core design of the algorithm and flow is not changed.

A third embodiment of the present disclosure relates to a method for service status analysis. The third embodiment differs from the first embodiment of the present disclosure in that: after the service status level of the vertex is determined according to the service attribute data of the vertex and an inter-vertex hierarchical relationship, the method further includes the following. Detect whether a service attribute change message is received. By querying for a service having a changed service attribute according to the service attribute change message, a target vertex representing the service having the changed service attribute is determined. Attribute data of the target vertex is adjusted according to the service attribute change message. According to the adjusted attribute data, a service status level of the target vertex is updated. Determine whether the service status level of the target vertex is changed. If the service status level of the target vertex is changed, a service status level of each of at least one upper-level vertex of the target vertex sequentially is updated according to the changed service status level of the target vertex.

Figure 6:
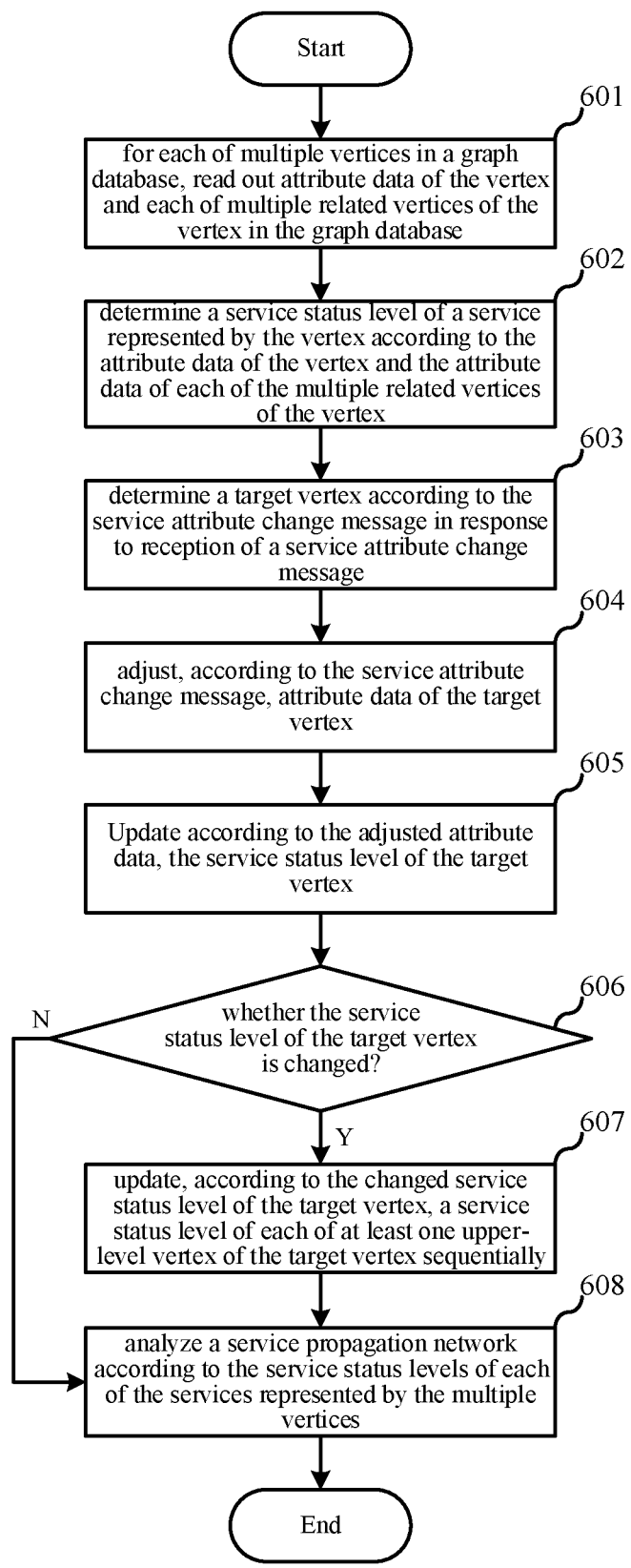
FIG. 6 is a flow chart illustrating a method for service status analysis according to a third embodiment of the present disclosure.

The specific implementation details of the method for service status analysis in the embodiment are illustrated below. As illustrated in FIG. 6, the method includes following operations.

At 601, for each of multiple vertices in a graph database, attribute data of the vertex and each of multiple related vertices of the vertex in the graph database are read out.

At 602, according to the attribute data of the vertex and the attribute data of each of the multiple related vertices of the vertex, a service status level of a service represented by the vertex is determined.

The operations at 601 and 602 in embodiments are similar to the operations at 101 and 102 of the first embodiment, and thus relevant implementation details are already described in the first embodiment of the present disclosure, which are not repeated herein.

At 603, in response to reception of a service attribute change message, a target vertex is determined according to the service attribute change message.

Specifically, in embodiments, a distributed message publishing and subscription system (Kafka®) is adopted to subscribe to service attribute change messages published by the network management system. The change of the service attributes includes change of alarm/performance data of the service. After the service attribute change message is received, filtering analysis may be performed on the message, such that only data having influence on the service attributes needs to be retained. If there is no data having the influence on the service status level through analysis, it means that the service attribute change message has no influence on the service status level, and thus the service attribute change message can be ignored. Furthermore, the alarm/performance data may be classified in advance, and classification levels are consistent with the service status levels. That is, only the data having the influence on the service is processed, and other data can be directly filtered out. If data having the influence on the service status level is obtained through analysis, a target vertex representing the affected service is further determined.

In an example, if data in the service attribute change message is configuration change data, one or more vertices are first added to the graph database or one or more vertices are first deleted from the graph database according to the service attribute change message, and then relevant operations are performed on corresponding vertices.

At 604, according to the service attribute change message, attribute data of the target vertex is adjusted.

At 605, according to the adjusted attribute data, the service status level of the target vertex is updated.

Specifically, if the service attribute change message has data having influence on the service status level, the attribute data stored in the target vertex is modified based on the data so as to apply the attribute data modified to the target vertex. If the change of the service attribute is alarm (alarm data of a service is modified), the service status level of the target vertex is updated based on a level of the alarm. If performance data of a service is modified, the service status level of the target vertex is updated based on a change of a performance attribute value.

At 606, it is determined whether the service status level of the target vertex is changed; if the service status level of the target vertex is changed, proceed to operations at 607; if the service status level of the target vertex is not changed, proceed to operations at 608.

At 607, according to the changed service status level of the target vertex, a service status level of each of at least one upper-level vertex of the target vertex is updated sequentially.

Figure 7:
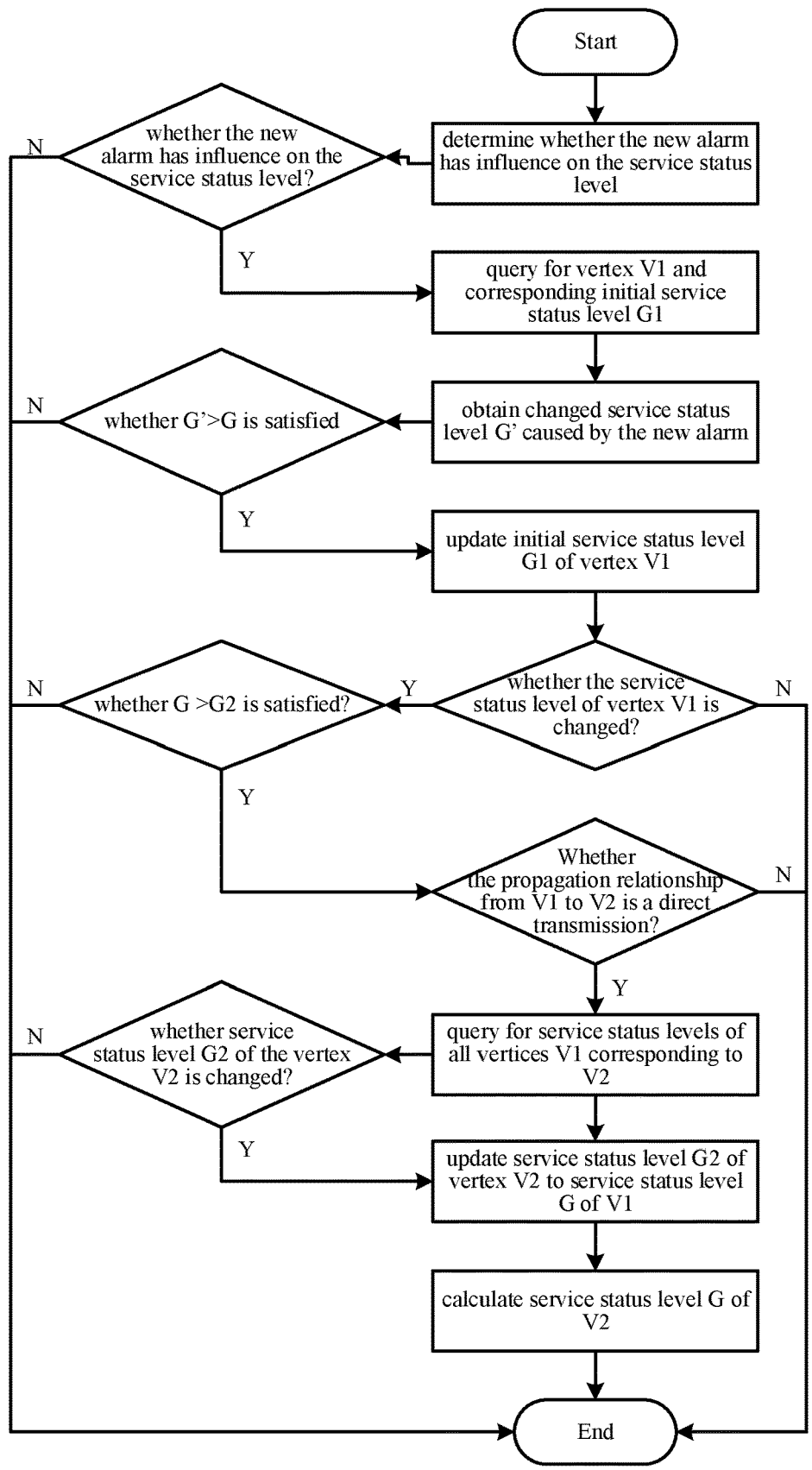
FIG. 7 is a flow chart illustrating updating of a service status level being triggered in response to a service attribute change message according to a third embodiment of the present disclosure.

Specifically, if the service status level of the target vertex is changed, starting from an upper-level vertex of the target vertex based on a preset service calculation rule, a service status level of each vertex is updated layer by layer until a final vertex is reached. The service change message being indicative of adding alarm data is taken as an example, updating of the service status level is described in detail with reference to FIG. 7.

After the service change message is received, the alarm data is analyzed. For example, the new alarm has no influence on the service status, the process is ended; Otherwise, process is continued. Initial service status level G1 of vertex V1 that is obtained by data query in the graph database is obtained through analysis. Service status level G' updated based on the service attribute change message is determined. G' and G1 are compared. If G'>G1, it indicates that newly-added alarm has influence on initial service status level G1 of V1, and then service status level G1 of V1 is updated to G', and process is continued; otherwise, it indicates that the newly-added alarm has no influence on initial service status level G1 of vertex V1 and then the process is ended. According to updated initial service status level G1 of V1, service status level G of V1 is confirmed. If G is unchanged, the process is ended; otherwise, process is continued. According to vertex V1, all upper-level vertices V2 of V1 and service status level G2 of each of vertices V2 that are affected by the lower-level vertex (i.e., V1) are obtained. Service status level G of V1 and service status level G2 of V2 are compared, and if G>G2, the process is continued; otherwise, the process is ended. A propagation relationship from V1 to V2 is confirmed. For example, if the propagation relationship from V1 to V2 is direct transmission, G2 of vertex V2 is directly modified to G. If a propagation relationship between V1 and V2 is complex transmission relationship (e.g., a multiplex relationship), process is continued. According to V2, one or more lower-level vertices of each of all other vertices each being located at a same layer as V1 and a service status level of each of the one or more lower-level vertices are queried for. According to a service calculation rule, service status level G2 of V2 affected by the lower-level vertex is re-calculated. If level G2 is unchanged, the process is ended; otherwise, service status level G of V2 is calculated and updating of service status level of V2 is ended.

Based on vertex V2, continue to calculate a service status level of each of at least one upper-level vertex of V2 layer by layer until a final service status level of each vertex is obtained, and then the final service status level of each vertex is reported and present. If alarm disappears, it is required to determine level G1 of the vertex based on an alarm list in the vertex attribute. If level G1 is unchanged, process is ended; otherwise, G1 is updated and level G of the vertex is confirmed. If level G is unchanged, process is ended; otherwise, a level of an upper-level vertex is determined. Thereafter, all upper-level vertices V2 of vertex V1 and service levels G2 respectively corresponding to vertices V2 are obtained again based on vertex V1 and subsequent operations are also performed sequentially until the service status levels of all upper-level vertices are updated.

At 608, according to the service status levels of each of the services represented by the multiple vertices, analysis is performed on a service propagation network.

The operations at 608 are similar to the operations at 103 of the first embodiment of the present disclosure and relevant implementation details are already described in the first embodiment of the present disclosure and are not repeated herein.

Figure 8:
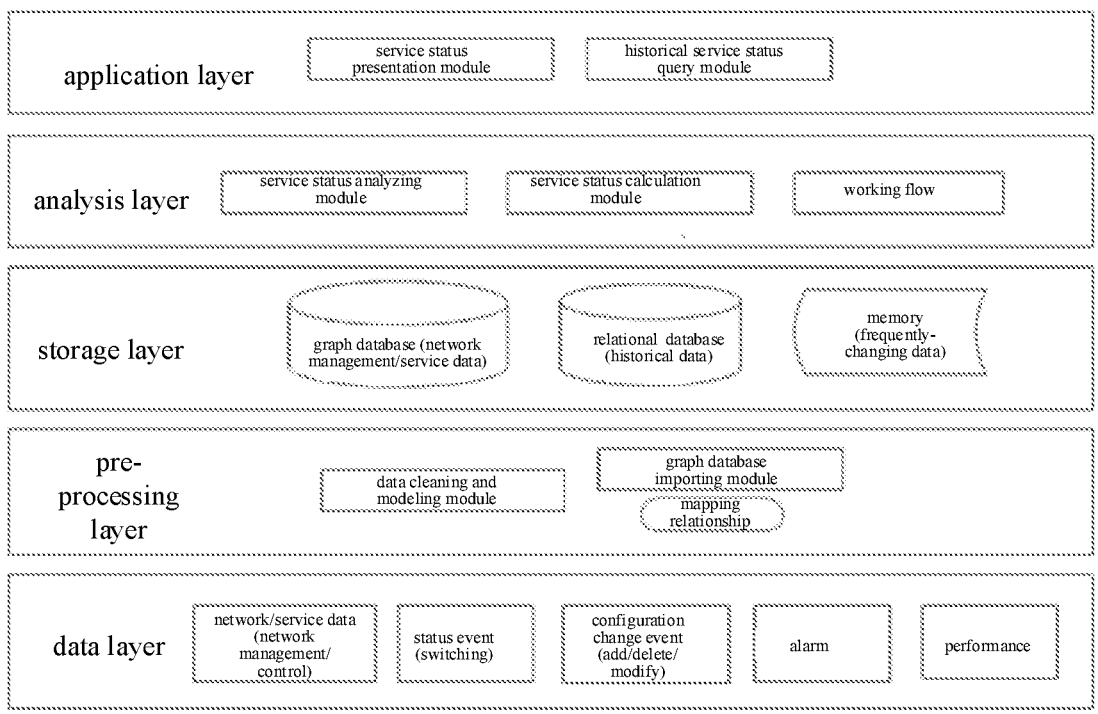
FIG. 8 is a structural schematic diagram illustrating a system for service status analysis according to a third embodiment of the present disclosure.

In some implementations, implementation manners are implemented based on a system for service status analysis as illustrated in FIG. 8. The system includes a data layer, a pre-processing layer, a storage layer, an analysis layer, and an application layer.

The data layer includes all source data required for constructing a graph database, and alarm/performance/event information required for dynamic analysis of service status. The relevant data are mainly obtained from a network management system and a northbound interface (NBI). The data may be obtained by query actively or subscribed to by Kafka, etc.

The pre-processing layer is mainly configured to process the source data and import the processed data into a graph database, and mainly includes a data cleaning and modeling module, an importing module, and a data mapping relationship. The data cleaning and modeling module is configured to process data from the data source and extract desired data. The graph database importing module is configured to import data into the graph database. The mapping relationship is configured for determining a mapping relationship between the source data and data in the graph database.

The storage layer includes a graph database, a relational database, and a memory. The graph database is a core of the entire system and stores network/service resource data. The relational database is mainly configured to store historical service status change data and provide a query function for historical data. The memory is mainly configured to store frequently-changed data, for example, temporary data in calculation process of service status.

The analysis layer includes a service status analyzing module, a service status calculation rule module, and a working flow. The service status analyzing module is configured to perform initialized calculation of the service status and dynamic calculation of the service status. The service status calculation rule module serves the service status analyzing module and is mainly configured to store calculation rules required in the service status analysis process. In some examples, a working flow is further provided to include all service processing flows for service status calculation, or no working flow is used and the service calculation processes are directly realized by codes.

The application layer mainly includes a service status presentation module and a historical service status query module. The service status presentation module is configured to display an analysis result of the service status analyzing module to help operations to perform service monitoring. The historical service status query module is configured to support change query of historical service status to meet the requirements of the operations on historical service query.

It is to be noted that modules involved in the embodiment are all logical modules. In practical applications, one logical unit may be one physical unit or part of one physical unit or a combination of multiple physical units. Further, in order to highlight the innovative part of the present disclosure, the embodiment does not introduce those units which are not closely related to the technical problems solved by the present disclosure, but it does not indicate that no other units are present in the embodiments.

It is to be noted that the above examples in the implementation are provided only for convenience of understanding and do not constitute any limitation to the technical solutions of the present disclosure.

The division of the steps of the above methods is used only for clear descriptions and the steps can be combined into one step or some steps can be divided into several steps in implementation, which shall fall within the scope of protection of the present disclosure as long as they include a same logical relationship. Adding of unnecessary modifications or introducing of unnecessary design in an algorithm or flow shall fall within the scope of protection of the present disclosure as long as the core design of the algorithm and flow is not changed.

Figure 9:
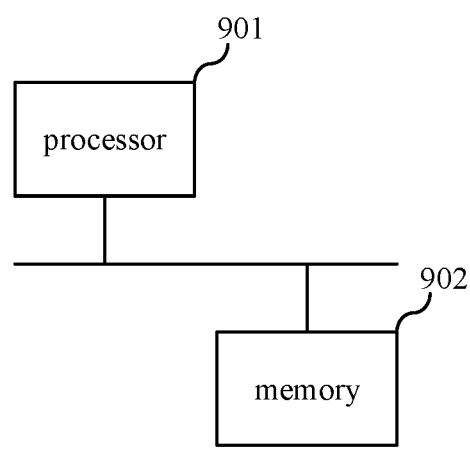
FIG. 9 is a structural schematic diagram illustrating a server according to a fourth embodiment of the present disclosure.

A fourth embodiment of the present disclosure relates to a server, including at least one processor 901 and a memory 902 in communication with the at least one processor 901 as illustrated in FIG. 9, where the memory 902 stores instructions executable by the at least one processor 901 and the instructions are executed by the at least one processor 901 to implement the above method for service status analysis in the first to third embodiments.

The memory 902 and the at least one processor 901 are connected via a bus. The bus may include any number of inter-connected buses and bridges. The bus connects different circuits of one or more processors 901 and the memory 902 together. The bus may also connect other circuits such as peripheral devices, voltage regulators, and power management circuits and the like together, which is well known in the art. Therefore, no further descriptions are made to them herein. A bus interface provides an interface between the bus and a transceiver. The transceiver may be one or more elements, for example, a plurality of receivers and transmitters, which is provided as a unit in communication with other apparatus on a transmission medium. Data processed by the processor 901 is transmitted on a wireless medium through antennas. Further, the antenna receives data and sends the data to the processor 901.

The processor 901 is configured to manage the buses and commonly-used functions and further provide various functions such as timing, peripheral interfaces, voltage regulation, power source management, and other control functions. The memory 902 is configured to store data used in performing operations by the processor 901.

A fifth embodiment of the present disclosure relates to a computer readable storage medium storing computer programs. The computer programs are executed by a processor to implement the above method embodiments.

Compared with an existing method for service status analysis, in embodiments, centralized storage of service data is achieved by means of the graph database generated in advance according to the service data. The service is represented by the vertex and a relationship between services is represented by the edge, such that initialized calculation of the service status level of the service may be carried out according to the attribute data of the vertex and the multiple related vertices of the vertex. Each related vertex is determined according to an edge between vertices. In this way, initial service operation status perception data can be obtained quickly, and the service propagation network is analyzed according to the service operation status, thereby satisfying the requirements of intelligent operation maintenance.

Those skilled in the art should understand that all or part of the steps for implementing the above method embodiments may be completed by instructing relevant hardware through programs. The programs may be stored in one storage medium and include several instructions used to enable one device (e.g., single chip microcomputer and chip and the like) or processor to perform all or part of the steps for implementing the method of each embodiment. The above storage medium includes U disk, removable hard disk, read only memory (ROM), random access memory (RAM), magnetic diskette, or compact disk, or other mediums capable of storing program codes.

Those skilled in the art may understand that the above embodiments are specific embodiments for implementing the present disclosure, and in practical applications, these embodiments may be changed in form or details without departing from the spirit and scope of the present disclosure.

What is claimed is:

1. A method for service status analysis, comprising:
for each respective vertex of a plurality of vertices in a graph database:
reading out attribute data of the respective vertex, wherein the graph database is generated in advance according to a service description table, the respective vertex represents a respective service, and the attribute data of the respective vertex comprises at least one service attribute of the respective service represented by the respective vertex; and
determining a service status level of the respective service represented by the respective vertex according to the attribute data of the respective vertex and attribute data of each of a plurality of related vertices; wherein each of the plurality of related vertices has a propagation relationship with the respective vertex; and
analyzing a service propagation network according to a service status level of each of a plurality of services represented by the plurality of vertices to obtain operation status of the plurality of services in the service propagation network.

2. The method of claim 1, wherein determining the service status level of the respective vertex according to the attribute data of the respective vertex and the attribute data of each of the plurality of related vertices comprises:
calculating an initial service status level of the respective vertex according to the attribute data of the respective vertex;
determining at least one lower-level vertex of the respective vertex according to the propagation relationship; and
determining the service status level of the respective vertex according to the initial service status level of the respective vertex and a service status level of each of the at least one lower-level vertex.

3. The method of claim 2, further comprising:
before determining the service status level of the respective vertex according to the initial service status level of the respective vertex and the service status level of each of the at least one lower-level vertex,
determining whether the at least one lower-level vertex of the respective vertex exists;
determining the initial service status level of the respective vertex as the service status level of the respective vertex based on a determination that no lower-level vertex of the respective vertex exists; and
determining the service status level of the respective vertex according to the initial service status level of the respective vertex and the service status level of each of the at least one lower-level vertex based on a determination that the at least one lower-level vertex of the respective vertex exists.

4. The method of claim 3, wherein determining the service status level of the respective vertex according to the initial service status level of the respective vertex and the service status level of each of the at least one lower-level vertex comprises:
determining a service relationship between the respective service represented by the respective vertex and a service represented by each of the at least one lower-level vertex;
determining a calculation rule of the service status level of the respective vertex according to the service relationship;
calculating a service status level of the respective vertex according to the calculation rule; and
determining the service status level of the respective vertex according to the initial service status level of the respective vertex and the calculated service status level of the respective vertex.

5. The method of claim 1, further comprising:
after determining the service status level of the respective service represented by the respective vertex according to the attribute data of the respective vertex and the attribute data of each of the plurality of related vertices:
adjusting, in response to reception of a service attribute change message, attribute data of a target vertex according to the service attribute change message, wherein the service attribute change message indicates that a service attribute of a service is changed, and the target vertex represents the service having a changed service attribute; and
updating a service status level of the target vertex according to the attribute data adjusted.

6. The method of claim 5, further comprising:
after updating the service status level of the target vertex according to the attribute data adjusted,
determining whether the service status level of the target vertex is changed; and
updating a service status level of each of at least one upper-level vertex of the target vertex sequentially according to the service status level changed of the target vertex based on a determination that the service status level of the target vertex is changed.

7. The method of claim 1, wherein the at least one service attribute comprises alarm data and performance data, and the alarm data comprises identifier information of alarm information in an alarm database.

8. The method of claim 1, wherein generating the graph database in advance according to the service description table comprises:
obtaining the service description table, wherein attribute data of each of several vertices and attribute data of each of edges connecting the several vertices are recorded in the service description table;
generating a configuration file according to the service description table;
adding information of at least one data source and at least one enumeration mapping relationship corresponding to values of the attribute data of each of the several vertices and the attribute data of each of the edges connecting the several vertices to the configuration file; and
importing in parallel the attribute data of each of the several vertices and the attribute data of each of the edges connecting the several vertices in the configuration file to generate the graph database.

9. A server, comprising:
at least one processor; and
a memory in communication with the at least one processor; wherein
the memory stores instructions executable by the at least one processor, and the instructions, when executed by the at least one processor, cause the at least one processor to:
for each respective vertex of a plurality of vertices in a graph database:
read out attribute data of the respective vertex, wherein the graph database is generated in advance according to a service description table, the respective vertex represents a respective service, and the attribute data of the respective vertex comprises at least one service attribute of the respective service represented by the respective vertex; and
determine a service status level of the respective service represented by the respective vertex according to the attribute data of the respective vertex and attribute data of each of a plurality of related vertices; wherein each of the plurality of related vertices has a propagation relationship with the respective vertex; and
analyze a service propagation network according to a service status level of each of a plurality of services represented by the plurality of vertices to obtain operation status of the plurality of services in the service propagation network.

10. A non-transitory computer-readable storage medium, storing computer programs, wherein the computer programs, when executed by a processor, cause the processor to:
for each respective vertex of a plurality of vertices in a graph database:
read out attribute data of the respective vertex, wherein the graph database is generated in advance according to a service description table, the respective vertex represents a respective service, and the attribute data of the respective vertex comprises at least one service attribute of the respective service represented by the respective vertex; and
determine a service status level of the respective service represented by the respective vertex according to the attribute data of the respective vertex and attribute data of each of a plurality of related vertices; wherein each of the plurality of related vertices has a propagation relationship with the respective vertex; and
analyze a service propagation network according to a service status level of each of a plurality of services represented by the plurality of vertices to obtain operation status of the plurality of services in the service propagation network.

11. The server of claim 9, wherein the instructions executed by the at least one processor to determine the service status level of the respective vertex according to the attribute data of the respective vertex and the attribute data of each of the plurality of related vertices are executed by the at least one processor to:
calculate an initial service status level of the respective vertex according to the attribute data of the respective vertex;
determine at least one lower-level vertex of the respective vertex according to the propagation relationship; and
determine the service status level of the respective vertex according to the initial service status level of the respective vertex and a service status level of each of the at least one lower-level vertex.

12. The server of claim 11, wherein the instructions, when executed by the at least one processor, further cause the at least one processor to:
before determining the service status level of the respective vertex according to the initial service status level of the respective vertex and the service status level of each of the at least one lower-level vertex,
determine whether the at least one lower-level vertex of the respective vertex exists;
determine the initial service status level of the respective vertex as the service status level of the respective vertex based on a determination that no lower-level vertex of the respective vertex exists; and
determine the service status level of the respective vertex according to the initial service status level of the respective vertex and the service status level of each of the at least one lower-level vertex based on a determination that the at least one lower-level vertex of the respective vertex exists.

13. The server of claim 9, wherein the instructions, when executed by the at least one processor, further cause the at least one processor to:
after determining the service status level of the respective service represented by the respective vertex according to the attribute data of the respective vertex and the attribute data of each of the plurality of related vertices:
adjust, in response to reception of a service attribute change message, attribute data of a target vertex according to the service attribute change message, wherein the service attribute change message indicates that a service attribute of a service is changed, and the target vertex represents the service having a changed service attribute; and
update a service status level of the target vertex according to the attribute data adjusted.

14. The server of claim 13, wherein the instructions, when executed by the at least one processor, further cause the at least one processor to:
after updating the service status level of the target vertex according to the attribute data adjusted,
determine whether the service status level of the target vertex is changed; and
update a service status level of each of at least one upper-level vertex of the target vertex sequentially according to the service status level changed of the target vertex based on a determination that the service status level of the target vertex is changed.

15. The server of claim 9, wherein the at least one service attribute comprises alarm data and performance data, and the alarm data comprises identifier information of alarm information in an alarm database.

16. The server of claim 9, wherein the instructions executed by the at least one processor to generate the graph database in advance according to the service description table are executed by the at least one processor to:
obtain the service description table, wherein attribute data of each of several vertices and attribute data of each of edges connecting the several vertices are recorded in the service description table;
generate a configuration file according to the service description table;
add information of at least one data source and at least one enumeration mapping relationship corresponding to values of the attribute data of each of the several vertices and the attribute data of each of the edges connecting the several vertices to the configuration file; and import in parallel the attribute data of each of the several vertices and the attribute data of each of the edges connecting the several vertices in the configuration file to generate the graph database.

17. The non-transitory computer-readable storage medium of claim 10, wherein the computer programs executed by the processor to determine the service status level of the respective vertex according to the attribute data of the respective vertex and the attribute data of each of the plurality of related vertices are executed by the processor to:

calculate an initial service status level of the respective vertex according to the attribute data of the respective vertex;

determine at least one lower-level vertex of the respective vertex according to the propagation relationship; and determine the service status level of the respective vertex according to the initial service status level of the respective vertex and a service status level of each of the at least one lower-level vertex.

18. The non-transitory computer-readable storage medium of claim 17, wherein the computer programs, when executed by the processor, further cause the processor to:

before determining the service status level of the respective vertex according to the initial service status level of the respective vertex and the service status level of each of the at least one lower-level vertex, determine whether the at least one lower-level vertex of the respective vertex exists;

determine the initial service status level of the respective vertex as the service status level of the respective vertex based on a determination that no lower-level vertex of the respective vertex exists; and determine the service status level of the respective vertex according to the initial service status level of the respective vertex and the service status level of each of the at least one lower-level vertex based on a determination that the at least one lower-level vertex of the respective vertex exists.

19. The non-transitory computer-readable storage medium of claim 10, wherein the computer programs, when executed by the processor, further cause the processor to:

after determining the service status level of the respective service represented by the respective vertex according to the attribute data of the respective vertex and the attribute data of each of the plurality of related vertices:

adjust, in response to reception of a service attribute change message, attribute data of a target vertex according to the service attribute change message, wherein the service attribute change message indicates that a service attribute of a service is changed, and the target vertex represents the service having a changed service attribute; and update a service status level of the target vertex according to the attribute data adjusted.

20. The non-transitory computer-readable storage medium of claim 19, wherein the computer programs, when executed by the processor, further cause the processor to:

after updating the service status level of the target vertex according to the attribute data adjusted, determine whether the service status level of the target vertex is changed; and update a service status level of each of at least one upper-level vertex of the target vertex sequentially according to the service status level changed of the target vertex based on a determination that the service status level of the target vertex is changed.

* * * * *